| SHIFT | RANGE | RATIO | DRIVE | CONV. | C1 | C2 C3 | O.W.C.1 | O.W.C.2 | O.W.C.3 | B |
|---|---|---|---|---|---|---|---|---|---|---|
| | N | | | FULL | | | | | | |
| DUMP } | 1 | $\left(\left[1+\frac{R_1}{S_1}\right)\left(1+\frac{S_2}{R_2}\right)-\frac{R_1}{S_1}\right]$ | CONV. | FULL | X | HS HS | | | X | |
| FILL } | 2 F.W. | $\left(1+\frac{S_1}{R_1}\right)\left(1+\frac{S_2}{R_2}\right)$ | MECH. | EMPTY | X | | X | X | X | |
| NON SYNCHR. } | 3 | $\left(1+\frac{S_2}{R_2}\right)$ | SPLIT | FULL | X | HS | | | X | |
| | 4 | 1 | MECH. | FULL | | X | | | X | |
| | R | $-C\frac{R_1}{S_1}$ | CONV. | FULL | | X | | X | RELEASE | X |

INVENTOR:
THOMAS R. STOCKTON
ATTORNEYS.

United States Patent Office 3,263,527
Patented August 2, 1966

3,263,527
MULTIPLE SPEED RATIO POWER TRANSMISSION MECHANISM HAVING CONTROLLABLE HYDROKINETIC UNIT AND TWO SIMPLE PLANETARY GEAR UNITS
Thomas R. Stockton, Northville, Mich., assignor to Ford Motor Company, Dearborn, Mich., a corporation of Delaware
Filed July 1, 1963, Ser. No. 291,803
6 Claims. (Cl. 74—688)

My invention relates generally to hydrokinetic power transmission mechanisms capable of being used in an automotive vehicle drive line, and more particularly to a hydrokinetic torque converter transmission mechanism having two simple planetary gear units wherein provision is made for establishing speed ratio changes between the lowest speed ratio and the highest speed ratio at evenly spaced increments.

In a preferred form of my invention, I have provided a power transmission mechanism capable of establishing four forward driving speed ratios and a single reverse speed ratio. An improved nonsynchronous coupling arrangement is provided for accomplishing speed ratio changes without requiring timed engagement and release of a friction clutch and a friction brake. I contemplate further that the hydrokinetic fluid circuit of the converter can be exhausted during a ratio change to one speed ratio and filled during operation in certain other speed ratios. I contemplate further that the power flow path defined by my improved mechanism during operation in the lowest speed ratio will include the hydrokinetic torque converter unit with full engine torque being delivered therethrough. During operation in the second speed ratio and the fourth speed ratio, however, the power flow path is a so-called solid drive that is wholly mechanical in character and the torque converter unit is not called upon to provide torque multiplication. During operation in the third speed ratio my improved mechanism is capable of providing a split torque delivery path with a portion of the torque being delivered through the hydrokinetic unit and the balance of the torque being delivered entirely mechanically through the gear system to the driven member.

Provision is made also for utilizing the hydrokinetic torque converter unit during reverse drive operation so that the converter torque ratio will be available to augment the torque ratio of the gear system during reverse drive.

The provision of an improved power transmission mechanism of the type above set forth being a principal object of my invention, it is a further object of my invention to provide a power transmission mechanism having simple planetary gear units and a hydrokinetic unit wherein one of the elements of one of the gear units functions as a common reaction element for the gear system during operation in the first three speed ratios and wherein provision is made for releasing the reaction member nonsynchronously during a shift to the highest speed ratio.

It is another object of my invention to provide a mechanism of the type above set forth wherein the common reaction element is anchored by means of a releasable brake structure capable of providing a nonsynchronous shift during a speed ratio change from the third speed ratio to the fourth high speed ratio and wherein provision is made for rendering the reaction brake structure ineffective during reverse drive operation.

It is a further object of my invention to provide a transmission mechanism of the type above set forth wherein the hydrokinetic fluid in the converter can be exhausted through a rotatable scoop member which is adapted to be braked selectively to provide an exhaust flow path for the fluid of the torus circuit of the hydrokinetic unit during a speed ratio change.

It is a further object of my invention to provide an improved releasable spring brake structure for anchoring one element of a planetary gear system to provide necessary driving torque reaction and wherein a pressure operated servo means is included for selectively releasing the spring brake structure to render it incapable of accommodating torque in either direction.

Further objects and features of my invention will become apparent from the following description and from the accompanying drawings wherein:

FIGURE 2A is a view taken along section line 2A—2A of FIGURE 2;

FIGURE 2B is a view taken along section line 2B—2B of FIGURE 2;

Figure 1:
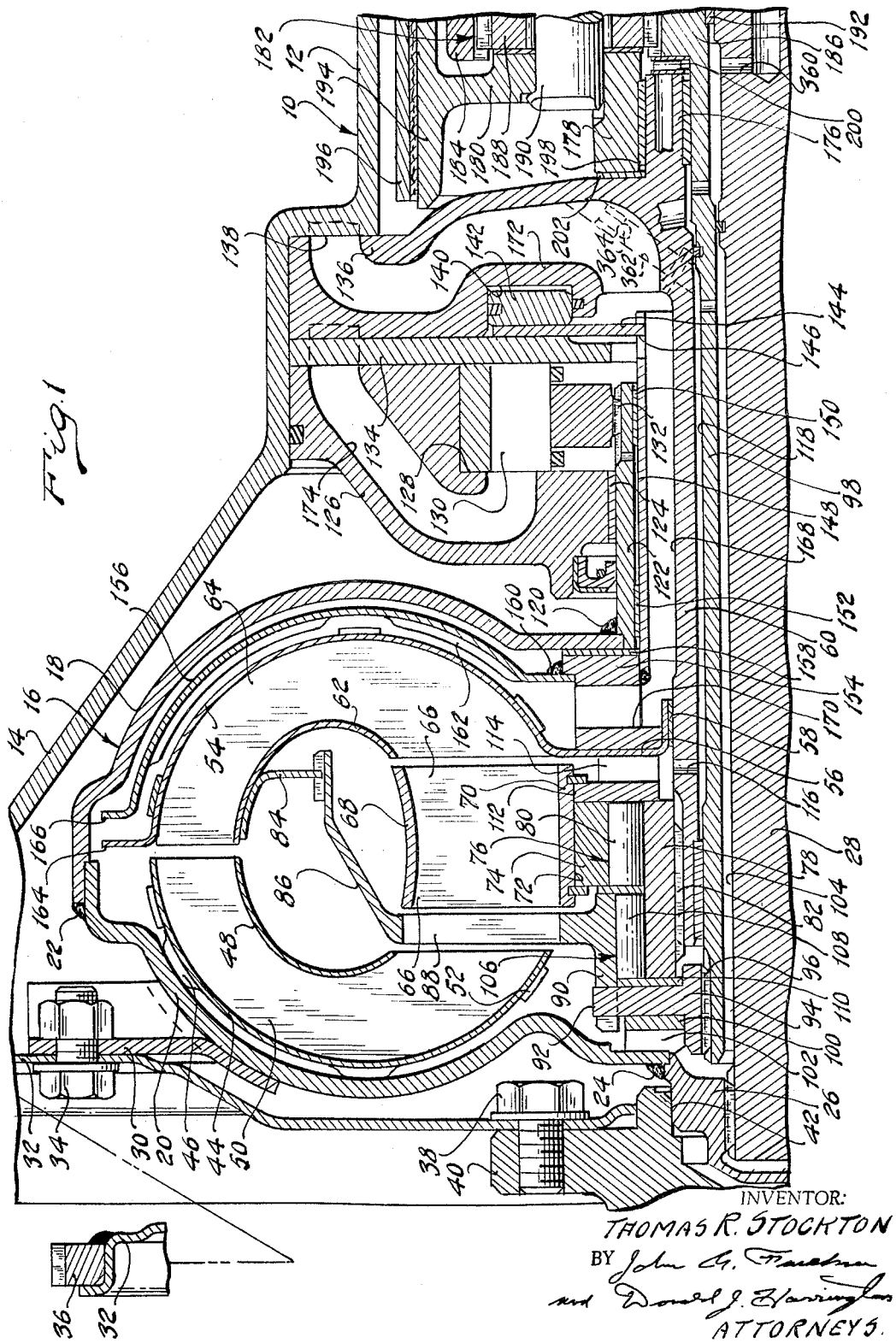
FIGURES 1 and 2 show in cross-sectional form an assembly view of a transmission mechanism that includes the features of my invention.

Referring first to FIGURE 1, the numeral 10 designates generally a power transmission housing. It includes a reduced diameter portion 12 and a relatively large diameter bell housing portion 14. Portion 12 accommodates the gear system and the clutch and brake structure subsequently to be described.

Bell housing portion 14 encloses a hydrokinetic torque converter unit generally identified by reference character 16. This unit includes an impeller shell having two parts identified separately by reference characters 18 and 20, each part being formed with a toroidal shape. The part 18 is secured at its periphery by means of welding 22 to the periphery of the part 20. The hub of part 20 is secured by welding 24 to an impeller hub 26 which in turn is splined to a central shaft 28.

The outer periphery of shell part 20 has secured thereto a drive bracket 30 which extends radially outwardly to facilitate a driving connection with the periphery of a drive plate 32. Suitable bolts 34 establish this connection. The periphery of drive plate 32 supports a starter ring gear 36 for an internal combustion vehicle engine.

The hub of drive plate 32 is bolted by bolts 38 to a flange 40 for the crankshaft of the internal combustion vehicle engine. Hub 26 is received within a pilot opening 42 formed in the crankshaft flange 40.

Secured to the inner surface of the shell part 20 is an outer impeller shroud 44. This connection can be formed by means of offset portions 46 which may be spot welded to the inner periphery of the shell 20.

An inner impeller shroud is shown at 48. It cooperates with shroud 44 to retain impeller blades 50. These blades in turn define radial out-flow passages in the normal fashion. The blades 50 can be secured to the shrouds 44 and 48 by means of tabs formed on their margins which are received within cooperating slots formed in the shrouds. The tabs can be bent in a tangential direction to establish a locked connection. These tabs are shown at 52.

An outer turbine shroud is shown at 54. It is formed with a toroidal shape that is similar to the shape of the shell part 18. The hub 56 of the shroud 54 is supported by means of a bushing 58 upon a stationary stator shaft 60.

An inner turbine shroud is shown at 62. Disposed between the shrouds 54 and 62 is a series of circumferentially spaced turbine blades 64 which cooperate with the shrouds to define radial in-flow passages. These passages are situated in toroidal fluid flow relationship with respect to corresponding passages that are defined by the blades 50 of the impeller.

Situated between the flow entrance region of the impeller and the flow exit region of the turbine is a bladed stator having stator blades 66 situated between a first stator shroud 68 and a second stator shroud 70. The blades 66 are arranged to redirect the flow of fluid that leaves the turbine exit section. Before the fluid enters the entrance region of the blade passages of the impeller, the tangential component of its absolute flow velocity vector increases thereby making a torque augmentation in the hydrokinetic unit possible.

Shroud 70 defines a stator hub having an opening 72 within which is situated an outer race 74 for an overrunning brake. This brake is generally identified by reference character 76 and includes an inner race 78 and overrunning coupling rollers 80. The race 74 can be cammed to provide cam surfaces which cooperate with rollers 80 to establish a one-way connection between blades 66 and the race 78.

Race 78 is splined by means of spline 82 to the stator shaft 60.

A drive bracket 84 is secured to the shroud 62 on the interior of the torus of the hydrokinetic unit. It is internally splined to establish a driving connection with an externally splined torque transfer member 86 which extends through the interior of the torus region. Member 86 includes a radially extending apertured portion 88 disposed between the exit region of the stator and the entrance region of the impeller. The apertures for the portion 88 are arranged so that a minimum of resistance to the toroidal fluid flow is developed.

The hub of torque transfer member 86, shown at 90, is keyed at 92 to a turbine hub 94. This hub is splined at 96 to a turbine shaft 98. A thrust washer 100 is disposed between the hub 94 and the hub of the shell part 20. Thrust washer 100 includes a back-up ring 102 having radial passages which permit fluid communication between an annular passage 104 between shafts 28 and 98 and the space between the shell part 20 and the shroud 44.

Another overrunning coupling 106 is disposed between the hub 90 of the torque transfer member 86 and the race 78. The hub 90 can be cammed to permit cooperation with over-running coupling rollers 108 situated between the hub 90 and the race 78.

A thrust washer 110 is disposed between hub 94 and the race 78. A roller retainer plate 112 is situated on the opposite side of the coupling 76 and is held axially fast by a snap ring as indicated. Another snap ring is situated on the opposite side of the race 74.

A thrust washer 114 is disposed between the plate 112 and the hub 56 of the shroud 54. This washer also is formed with radial passages which permit communication between the interior of the torus circuit of the hydrokinetic unit and a radial port 116 formed in the stator shaft 60. Port 116 in turn communicates with an annular passage 118 defined by the concentric shafts 98 and 60.

The hub of shell part 18 is welded at 120 to a support sleeve shaft 122. The shaft in turn is journaled by means of a bushing 124 within an opening formed in a separator wall structure 126. This wall structure forms a part of the transmission housing 10 and defines a pump chamber 128. Situated within chamber 128 are positive displacement pump elements 130, a driving portion of which is splined at 132 to the shaft 122.

Chamber 128 is covered by a closure plate 134 which is sandwiched between wall structure 126 and another wall structure 136. The wall structures 126 and 136 can be bolted together to a shoulder 138 formed at the juncture of the housing portions 14 and 12.

Wall structure 136 defines an annular cylinder 140 within which is situated an annular piston 142. Disposed between piston 142 and the plate 134 is a friction brake disc 144. When fluid pressure is admitted to the annular pressure cavity defined by the cylinder 140 and the piston 142, piston 142 is urged into frictional engagement with the disc 144. The adjacent surface of the plate 134 defines a friction surface which cooperates with the disc 144.

Disc 144 is keyed at 146 to a sleeve shaft 148. This shaft in turn is journaled within shaft 122 by bushings 150 and 152. It is connected drivably to a hub 154 for a rotatable scoop member 156. A thrust bushing 158 is disposed between the hub of shell part 18 and hub 154.

Hub 154 is connected by welding 160 to the inner peripheral margin of the scoop member 156, the latter being generally toroidal in shape to conform to the shape of the interior surface of shell part 18. It is disposed within the space between shell part 18 and the turbine shroud 54. Suitable fluid directing vanes 162 can be provided on the interior of the scoop member 156 to establish a centrifugal pumping action for the fluid.

The margin of the shroud 54 is turned radially outwardly at the outer periphery of the hydrokinetic unit as shown at 164. In a similar fashion, the margin 166 of the scoop member 156 is turned radially outwardly. This establishes an annular opening that communicates with the interior of the torus circuit of the hydrokinetic unit.

The annular space between stator shaft 60 and the sleeve shaft 148 defines an annular fluid passage 168 which communicates with the interior of the scoop member 156 through a radial passage 170 formed in the hub 154. The passage 168 communicates also with an internal passage 172 formed in the wall structure 136. This passage in turn communicates with an automatic control valve system of which the positive displacement pump, shown in part at 130, forms a part. A fluid pressure inlet passage for the pump is shown at 174 and is defined in part by coring formed in the wall structure 126. It communicates with a fluid pressure reservoir or sump at the lower portion of the transmission structure.

Wall structure 136 includes an annular extension 176 upon which is supported the hub 178 of a planetary carrier 180. This carrier forms a part of a first planetary gear unit generally identified by reference character 182. Gear unit 182 includes also a ring gear 184, a sun gear 186 and several planet gears 188. Each planet gear is rotatably journaled upon a pinion shaft 190 that in turn is supported by the carrier 180.

Sun gear 186 is formed integrally with shaft 98 and receives turbine torque produced by the hydrokinetic unit. It is supported upon a bushing 192 surrounding the shaft 28.

A brake drum 194 is carried by the carrier 180. It defines a brake surface around which is situated a reverse brake band 196. This band can be applied by means of a selectively operable fluid pressure operated servo in a conventional fashion.

A bushing 198 provides the needed bearing support for the carrier 180. Thrust bearings 200 and 202 are disposed between sun gear 180 and the extension 176 and between the hub 178 and the wall structure 136, respectively.

Ring gear 184 is connected to a clutch drum 204. This drum is supported upon shaft 28 by means of a bushing 206. A thrust washer 208 separates the drum 204 from the sun gear 186.

Drum 204 defines an annular clutch cylinder 210 within which is slidably positioned an annular piston 212. The piston 212 is urged in a left-hand direction by a clutch release spring 214 which in turn is anchored upon a spring seat 216 that is held axially fast by means of a snap ring upon the hub 218 of the drum 204.

The inner periphery of the drum 204 is splined as indicated at 220. This facilitates a driving connection with externally splined clutch discs 222 which are situated in interdigital relationship with respect to internally splined discs 224. Discs 224 in turn are connected by means of a splined connection to clutch member 226 which in turn is splined at 228 to the shaft 28. Another clutch member 230, which functions also as a clutch pressure backup element, is externally splined to internally splined drum 204. It is held axially fast by a snap ring 232. Disposed between element 230 and the clutch discs 224 and 222 is an outer race 234 for an overrunning clutch assembly identified generally by reference character 236. Overrunning coupling 236 includes also rollers 238 which cooperate with cammed surfaces formed on race 234 to establish a one-way driving connection between race 234 and an inner race 240 carried by a clutch member 242, the latter in turn being splined at 244 to a power output shaft 246.

Thrust washers are positioned as shown between element 226 and extension 218 and between element 230 and the clutch member 242. Clutch member 230 defines an annular cylinder 247 within which is positioned an annular piston 248. A piston return spring 250 acts upon the piston 248 to urge it in a left-hand direction. Spring 250 is seated upon a spring seat 252 that is held axially fast by means of a snap ring upon a circular hub extension 254 of the member 230.

A clutch pressure backup plate 256 is externally splined to internally splined drum 204 and is held axially fast by a snap ring 258. Externally splined clutch discs 260 are drivably connected to the internally splined drum 204. These are situated in interdigital relationship with respect to internally splined discs 262 that are splined in turn to an extension 264 of a carrier 266 for a second planetary gear unit. This gear unit is identified generally by reference character 268.

Gear unit 268 includes also a ring gear 270 that is keyed to a drum shaped drive member 272 which establishes a driving connection between carrier 180 and ring gear 270. Ring gear 270 is disposed in meshing engagement with planet pinion gears 274, each of which is rotatably supported upon a pinion shaft 276. Shafts 276 in turn are carried by the carrier 266.

Gears 274 mesh also with a sun gear 278 which is supported by means of bushings 280 upon the power output shaft 246. If desired, a parking gear 282 can be carried by the carrier 266. Provision may be made in the usual fashion for locking gear 288 to the transmission housing thereby holding the power output shaft 246 stationary.

Carrier 266 is splined at 284 to the power output shaft 246.

A thrust bearing 286 is disposed between the extension 254 and the carrier 266. Another thrust bearing is provided as shown at 288 between the adjacent ends of the shafts 28 and 246.

Sun gear 278 is splined to the hub of a brake drum 290. Drum 290 is supported by means of a bushing 292 upon a boss 294 carried by an end wall structure 296. This wall structure is situated at the end of housing portion 12 at the juncture of housing portion 12 and a tail-shaft extension housing 298. Drum 290 includes a braking surface 300 about which is disposed a selectively engageable brake band 302. Like the brake band 196, the brake band 302 can be applied and released by means of a suitable fluid pressure operated servo.

Thrust bearings 304 and 306 are disposed on either side of the sun gear 278 to accommodate axial thrust.

Boss 294 defines a cylindrical surface 308 around which is positioned a mutiple wrap brake element in the form of a spring 310. The spring 310 is formed with a rectangularly shaped cross section and the outer periphery of the windings is adapted to engage slightly the inner periphery 312 of the drum 290. A slight frictional drag then is maintained between these two members.

Boss 294 is formed with a keyway 314 within which is situated a key 316 which extends radially outwardly from the surface 308. One end of spring 310 is adapted to abut the key 316 as best indicated in FIGURE 2A.

Pivoted upon the inner side 318 of the boss 294 is a spring operating lever 320. This lever is pivoted upon the shank of a bolt 322 that is received within a threaded opening formed in boss 294. The outer end 324 of the lever 320 is adapted to engage an offset end 326 of the spring 310, as best seen in FIGURE 2A, when it is moved in the direction of the arrow 328. This movement can be accomplished by means of a suitable pressure operated servo that includes a piston plunger 330 received within a cylindrical opening 332 formed in the boss 294. The opening 332 extends tangentially with respect to the axis of the transmission mechanism and cooperates with the piston 330 to define a fluid pressure cavity that can be supplied with fluid pressure through a suitable internal pressure feed passage 334 formed in the boss 294.

It thus is apparent that the brake drum 290 will be inhibited from rotation in one direction by the spring 310, but is capable of freewheeling motion in the opposite direction. If the brake drum 290 tends to turn in the one direction, the slight frictional drag of the spring 310 will produce a grabbing action on the surface 312 that will tend to lock the drum 290 to the wall structure 296. On the other hand if the drum tends to rotate in the opposite direction, the grabbing action of the spring will be relaxed and the end of the spring will become unseated from the reaction key 316.

Figure 2:
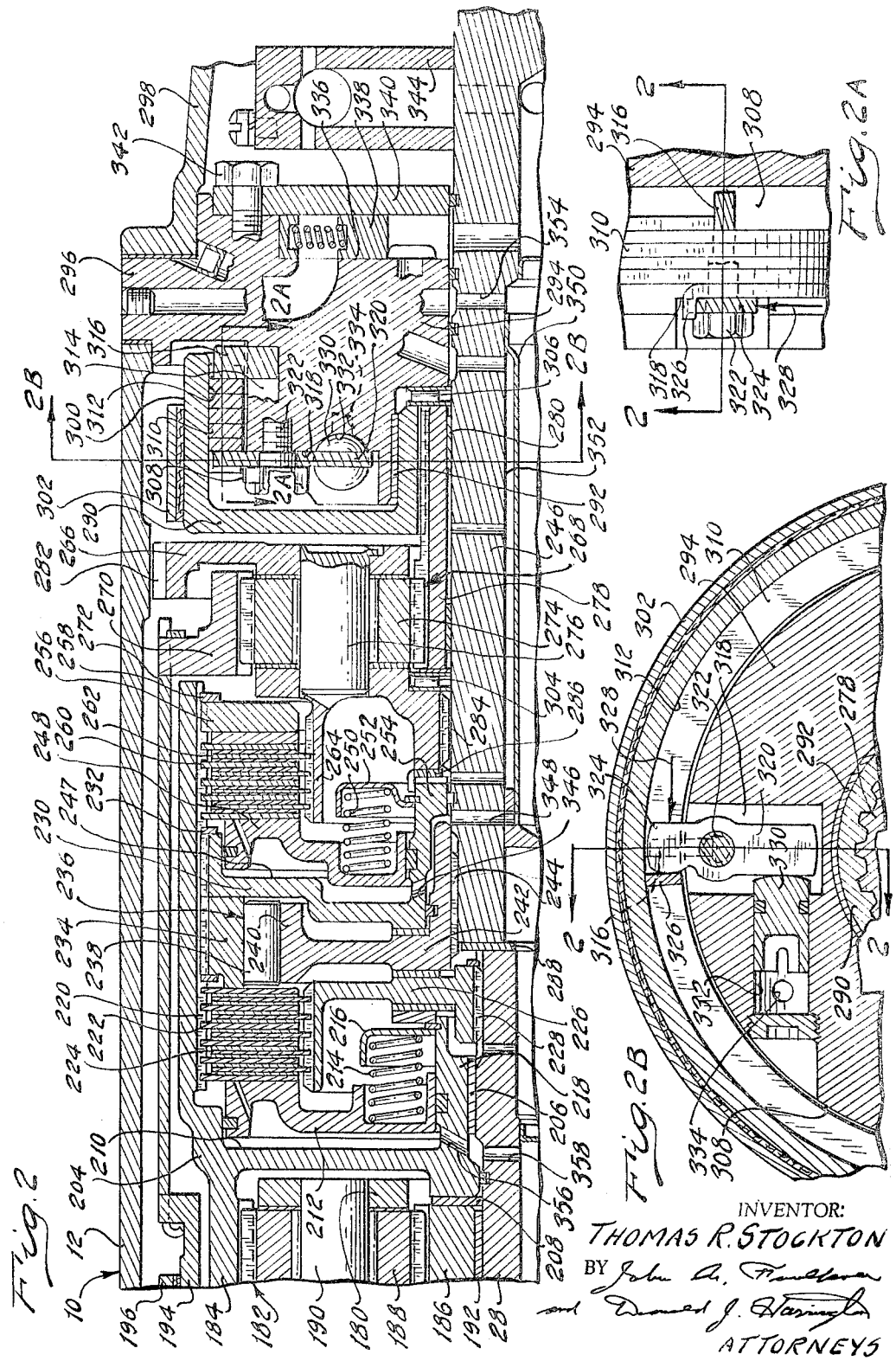

If fluid pressure is admitted to the servo defined by cylinder 332 and piston 330, the lever 320 will be pivoted about the axis of the bolt 322. This axis, as shown in FIGURE 2A, falls in the plane of section line 2—2, which corresponds to the plane of the section of FIGURE 2. This causes the spring 310 to wind up which reduces its effective outside diameter. This establishes a slight clearance between the outer periphery of the spring 310 and the surface 312 of the brake drum 290. The brake drum 290 thus can be rotated in either direction with respect to the wall structure 296. As will subsequently become apparent, the spring brake servo is pressurized to release the spring during operation in reverse drive. It will become apparent also that the spring 310 will lock the sun gear 278 and the drum 290 to establish a reaction point during operation in the first, second and third speed ratios. During operation in the fourth speed ratio, it will accommodate freewheeling motion of the sun gear 278 and drum 290.

Wall structure 296 defines a pump chamber 336 within which are situated positive displacement pump elements 338. The driving portion of the elements 338 can be connected drivably to power output shaft 246. The pump chamber is closed by a closure plate 340 which is bolted by bolts 342 to the wall structure 296.

A fluid pressure governor 344, which forms a part of the automatic control system, is keyed or splined to power output shaft 246 within the transmission extension housing 248.

Fluid pressure for operating the rear clutch can be supplied to the cylinder 246 through a supply port 346 formed in the extension 254. Port 346 is in fluid communication with the radial passage 348 which in turn communicates with the interior of a fluid pressure distributor insert 350. This insert is received within a central opening 352 formed in shaft 246. The annular space between the wall of opening 352 and the insert 350 defines in part a lubrication valve circuit.

Clutch pressure is distributed to the interior of the insert 350 through a radial passage 354 formed in the power output shaft 246. This passage in turn communicates with a fluid pressure distributor manifold defined by the wall structure 296. The manifold forms a part of the automatic control valve circuit.

Fluid pressure is distributed to the cylinder 210 of the front clutch through a radial port 356 formed in the extension 218 of the drum 204. This passage is in fluid communication with radial passages 358 and 360 formed in shaft 28. Passage 360 in turn communicates with a fluid pressure distributor manifold formed in part by the wall structure 136. The wall structure 136 defines also an air exhaust passage 362 which communicates with the annular passage 118 described previously. This accommodates the entry of air into the region of the torus circuit when the fluid is evacuated therefrom. The one-way check valve 364 in the passage 362 permits entry of air from the atmosphere to the passage 362, but prevents evacuation of fluid from the passage 362.

Figures 3, 4:
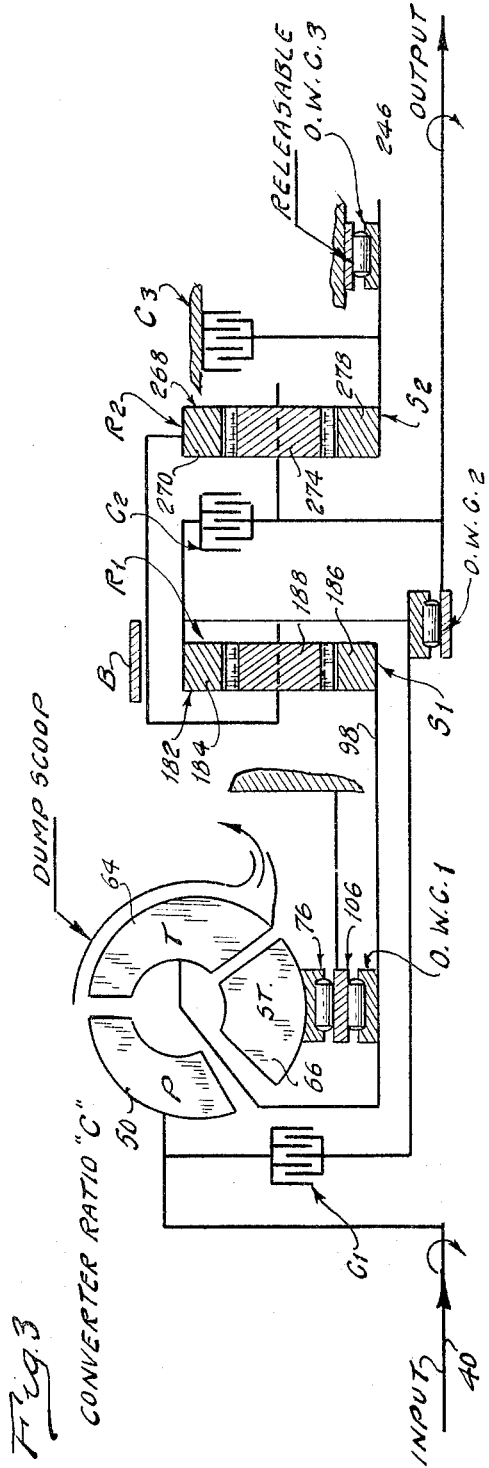
FIGURE 3 shows in schematic form the components the structure of FIGURES 1 and 2.
FIGURE 4 is a chart showing the clutch and brake engagement and release pattern that is followed during speed ratio changes in the mechanism of FIGURES 1 and 2.

In FIGURE 3 I have illustrated in schematic form the components of the structure of FIGURES 1, 2 and 2A. For purposes of simplicity, the impeller has been indicated by the symbol P, the turbine has been indicated by the symbol T and the stator has been indicated by the symbol ST.

The front clutch of which clutch discs 222 and 224 form a part is illustrated in FIGURE 3 by symbol $C_1$, the rear clutch is indicated as $C_2$ and the friction brake, of which brake band 302 and brake drum 290 form a part, is indicated by the symbol $C_3$.

The overrunning coupling between the turbine and the stator shaft is indicated by the symbol $OWC_1$. The overrunning coupling 236 is indicated by the reference symbol $OWC_2$ and the overrunning coupling of which spring 310 forms a part is indicated by the symbol $OWC_3$.

The reverse brake band 196 is indicated in FIGURE 3 by the symbol B.

The ring gear and the sun gear for the front planetary gear unit have been identified in FIGURE 3 by the symbols $R_1$ and $S_1$, respectively. The corresponding symbols for the ring gear and the sun gear of the rear planetary gear unit are $R_2$ and $S_2$.

To establish a first speed ratio, the converter is filled through the fluid feed passages described earlier. Both clutches $C_2$ and $C_3$ can be engaged to provide a hill-braking characteristic although they are not required to establish a power flow path between the engine and the power output shaft.

The sun gear $S_1$ functions as a power input element that is driven by the turbine T. This tends, of course, to cause the ring gear $R_1$ to rotate in a backward direction which causes the overrunning coupling $OWC_2$ to lock-up. The output carrier torque of the first gear unit is distributed to the ring gear $R_2$ of the second gear unit and the sun gear $S_2$ functions as a reaction element since it is anchored by the engaged overrunning coupling $OWC_3$. The output shaft then will be driven at a speed ratio magnitude which is indicated in FIGURE 4 under the column entitled, "Ratio."

To establish a speed ratio shift from the first speed ratio to the second speed ratio, the hydrokinetic unit is exhausted applying pressure to the annular cylinder 140. This causes brake disc 140 to become anchored thereby anchoring the rotatable scoop member 156. The fluid in the torus circuit in the converter then will be exhausted radially inwardly through the annular exhaust passage defined by the outer surface of the shroud 54 and the scoop member 156. The fluid passes through passage 168 and passage 172 to a fluid pressure reservoir, not shown. In addition, clutch C1 is applied. Thus, the torque converter unit is entirely bypassed and the power flow path is entirely solid or mechanical. Torque is distributed directly to the ring gear $R_1$, and the sun gear $S_1$ thus functions as a reaction member since it is inhibited from rotation in a backward direction by the overrunning coupling $OWC_1$. The output torque of the carrier for the front gear unit 182 is thus distributed to the ring gear $R_2$ of the gear unit 268. As before, the sun gear $S_2$ functions as a reaction member since it is anchored by the overrunning coupling $OWC_3$. The overrunning coupling $OWC_2$ free-wheels under these conditions. The magnitude of the ratio that thus is produced is indicated in FIGURE 4.

The third speed ratio is a split-torque drive with a portion of the torque being delivered hydrokinetically and the balance of the torque being delivered mechanically through the gear units. To establish such a split torque drive, the converter is refilled by releasing the brake disc 144 and supplying fluid to the torus circuit if the torque converter through the medium of the pump 130. Brake $C_3$ can be applied to effect hillbraking although it is not required to establish a torque delivery path from the engine to the output shaft. The reaction torque is accommodated by the overrunning coupling $OWC_3$. Under these conditions, turbine torque is delivered to the sun gear $S_1$ and ring gear $R_1$ receives torque directly from the power input shaft through the clutch $C_1$.

The front planetary gear unit thus assumes a ratio approximately equal to unity. It receives a portion of its torque hydrokinetically and the balance of the torque mechanically. The output of the front gear unit is delivered to the ring gear $R_2$ of the gear unit 268. As before, sun gear $S_2$ acts as a reaction member and the carrier for the rear gear unit is distributed to the power output shaft.

High speed ratio is achieved by applying clutches $C_1$ and $C_2$ simultaneously. It is not necessary to empty the hydrokinetic unit, although it is ineffective to transmit power since it is bypassed by the clutch $C_1$. Operation in the fourth speed ratio thus is entirely mechanical and the operating efficiency during cruising operation therefore is at a maximum value.

Reverse drive is obtained by engaging clutch $C_2$ and applying brake band B. The converter is filled. Turbine torque then is delivered to the sun gear $S_1$ which causes ring gear $R_1$ to rotate in a reverse direction. This reverse rotation is transferred through clutch $C_2$ to the power output shaft, thus causing the latter to rotate in a backward direction. The gear unit 268 performs no function during reverse drive operation.

In the table of FIGURE 4, the symbol C represents converter torque ratio. The over-all torque ratio, of course, is equal to the converter ratio C times the gear ratio of the combined planetary gear units.

Having thus described a preferred embodiment of my invention, what I claim and desire to secure by United States Letters Patent is:

1. In a multiple speed power transmission mechanism having a hydrokinetic unit, a pair of simple planetary gear units capable of delivering power from a driving member to a driven member, said hydrokinetic unit comprising an impeller and a turbine situated in toroidal fluid flow relationship, said impeller being connected to said driving member, each gear unit comprising a ring gear, a sun gear, planet gears meshing with said sun and ring gears and a carrier rotatably supporting said planet gears, said turbine being connected to a first power input element of a first of said gear units, first selectively engageable clutch means for connecting said impeller to a second power input element of said first gear unit, a power output element of said first gear unit being connected to one element of said second gear unit, means for anchoring a second element of said second gear unit to establish a torque reaction, second selectively engageable clutch means for connecting one element of said first gear unit with an element of said second gear unit, a power output element of said second gear unit being connected to said driven member, selectively operable means for rendering said hydrokinetic unit ineffective for torque delivery, means for anchoring said first power input element of said first gear unit when said hydrokinetic unit is ineffective, and means for delivering torque between said second power input element and said driven member.

2. A power transmission mechanism having multiple speed ratios for drivably connecting a driving member to a driven member comprising a hydrokinetic unit having a turbine and an impeller disposed in toroidal fluid flow relationship, a pair of simple planetary gear units, each gear unit comprising a sun gear, a ring gear, planet gears meshing with said sun and ring gears and a carrier rotatably supporting said planet gears, said turbine being connected to the sun gear of a first of said gear units, the carrier of said first gear unit being connected to the ring gear of the second gear unit, means for anchoring the sun gear of said second gear unit to establish a torque reaction path to a stationary portion of said mechanism, the carrier of the second gear unit being connected to said driven member, first selectively engageable clutch means for connecting together one element of said first gear unit with portions of said second gear unit, means for distributing torque between the ring gear of said first gear unit and said driven member, first selectively engageable clutch means for connecting said impeller to the ring gear of said first gear unit, means for selectively exhausting fluid from said hydrokinetic unit to render it incapable of delivering torque, and means for anchoring the sun gear of said first gear unit when said hydrokinetic unit is exhausted.

3. A multiple speed power transmission mechanism having a hydrokinetic unit, a pair of simple planetary gear units capable of delivering power from a driving member to a driven member, said hydrokinetic unit comprising an impeller and a turbine situated in toroidal fluid flow relationship, said impeller being connected to said driving member, each gear unit comprising a ring gear, a sun gear, planet gears meshing with said sun and ring gears and a carrier rotatably supporting said planet gears, said turbine being connected to a first power input element of a first of said gear units, first selectively engagebale clutch means for connecting said impeller to a second power input element of said first gear unit, a power output element of said first gear unit being connected to one element of said second gear unit, means for anchoring a second element of said second gear unit to establish a torque reaction, second selectively engageable clutch means for connecting one element of said first gear unit with an element of said second gear unit, a power element of said second gear unit being connected to said driven member, selectively operable means for rendering said hydrokinetic unit ineffective for torque delivery, means for anchoring said first power input element of said first gear unit when said hydrokinetic unit is ineffective, means for delivering torque between said second power input element and said driven member, and selectively engageable brake means for anchoring the power output element of said first gear unit to establish reverse drive operation, said first selectively engageable clutch means being engaged during reverse drive operation.

4. A power transmission mechanism having multiple speed ratios for drivably connecting a driving member to a driven member comprising a hydrokinetic unit having having a turbine and an impeller disposed in toroidal fluid flow relationship, a pair of simple planetary gear units, each gear unit comprising a sun gear, a ring gear, planet gears meshing with said sun and ring gears and a carrier rotatably supporting said planet gears, said turbine being connected to the sun gear of a first of said gear units, the carrier of said first gear unit being connected to the ring gear of the second gear unit, means for anchoring the sun gear of said second gear unit to establish a torque reaction path to a stationary portion of said mechanism, the carrier of the second gear unit being connected to said driven member, first selectively engageable clutch means for connecting together one element of said first gear unit with portions of said second gear unit, means for distributing torque between the ring gear of said first gear unit and said driven member, second selectively engageable clutch means for connecting said impeller to the ring gear of said first gear unit, means for selectively exhausting fluid from said hydrokinetic unit to render it incapable of delivering torque, means for anchoring the sun gear of said first gear unit when said hydrokinetic unit is exhausted, and selectively engageable brake means for anchoring the carrier of said first gear unit to condition said mechanism for reverse drive operation, said first selctvely engageable clutch means being engaged during reverse drive operation.

5. In a power transmission mechanism, a hydrokinetic unit having an impeller and a turbine situated in toroidal fluid flow relationship, a pair of simple planetary gear units, each gear unit comprising a sun gear, a ring gear, planet gears meshing with said sun and ring gears and a carrier rotatably supporting said planet gears, the sun gear of a first of said gear units being connected to said turbine, first overrunning coupling means for inhibiting backward rotation of said sun gear with respect to the direction of rotation of said impeller, first selectively engageable clutch means for connecting said impeller to the ring gear of the first gear unit, second overrunning coupling means for establishing a one-way driving connection between the ring gear of said first gear unit and said driven member, third overrunning coupling means for anchoring the sun gear of the second of said gear units against rotation in one direction but permitting free-wheeling motion thereof in the opposite direction, the carrier of the first gear unit being connected to the ring gear of the second gear unit, the carrier of the second gear unit being connected to said driven member, second selectively engageable clutch means for connecting together the ring gear of the first gear unit and the carrier of the second gear unit, and a reverse brake means for anchoring the carrier of the first gear unit.

6. In a power transmission mechanism, a hydrokinetic torque converter unit having an impeller and a turbine situated in toroidal fluid flow relationship, a pair of simple planetary gear units, each gear unit comprising a sun gear, a ring gear, planet gears meshing with said sun and ring gears and a carrier rotatably supporting said planet gears, the sun gear of a first of said gear units being connected to said turbine, first overrunning coupling means for inhibiting backward rotation of said sun gear with respect to the direction of rotation of said impeller, first selectively engageable clutch means for connecting said impeller to the ring gear of the first gear unit, second overrunning coupling means for establishing a one-way driving connection between the ring gear of said first gear unit and said driven member, third overrunning coupling means for anchoring the sun gear of the second of said gear units against rotation in one direction but permitting free-wheeling motion thereof in the opposite direction, the carrier of the first gear unit being connected to the ring gear of the second gear unit, the carrier of the second gear unit being connected to said driven member, second selectively engageable clutch means for connecting together the ring gear of the first gear unit and the carrier of the second gear unit, a reverse brake means for anchoring the carrier of the first gear unit, and hillbrake means for anchoring the sun gear of the second gear unit against rotation in both directions thereby bypassing said third overrunning coupling means.

References Cited by the Examiner

UNITED STATES PATENTS

| 2,736,407 | 2/1956 | Smirl | 74—688 |
| 2,874,590 | 2/1959 | Kelbel | 74—688 |
| 3,010,343 | 11/1961 | Orr | 74—759 |

DAVID J. WILLIAMOWSKY, *Primary Examiner.*

J. R. BENEFIEL, *Assistant Examiner.*